Aug. 14, 1951   F. R. CURTISS   2,564,426
FISHING FLOAT
Filed Oct. 2, 1945

*INVENTOR.*
FRANK R. CURTISS
BY
*ATTORNEY*

Patented Aug. 14, 1951

2,564,426

UNITED STATES PATENT OFFICE 2,564,426

FISHING FLOAT

Frank R. Curtiss, New Haven, Conn.

Application October 2, 1945, Serial No. 619,857

5 Claims. (Cl. 43—44.88)

1

This invention relates to new and useful improvements in floats for use on fishing lines.

An object of the invention is to provide a fishing float including means whereby the float may be attached to a line for free movement along the latter and also including means for locking or securing the float in a selected position along the line and which latter means is readily releasable on the winding in of a line to bring a portion of the float against the end of a pole.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
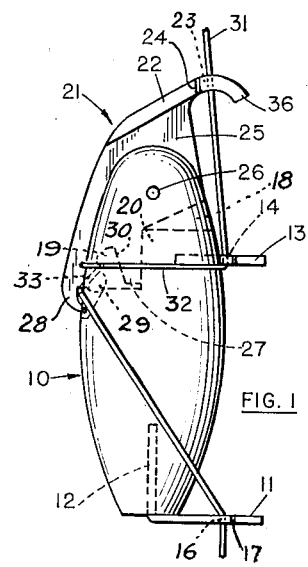
Fig. 1 is a side elevational view of the float of the invention showing the same as locked or secured to a line.
Figure 2:
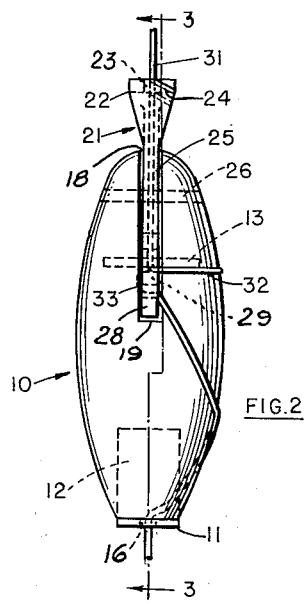
Fig. 2 is a rear elevational view of the float.

Heretofore it has been generally customary to make fishing floats in such a way that they are secured in fixed positions on lines and in some instances the construction is such that the float may be worked along the line by loosening of the line first at one end and then at the other end of the float. However, so far as known, the floats as heretofore made are of such construction that on the reeling in of the line once the float has been brought to the end of the pole further reeling in is practically impossible. Therefore, when fishing at relatively great depth the length of line beyond the float may well be of greater length than the length of the pole

2 used and in such case landing of a fish becomes nearly an impossibility.

The present invention provides a float including a body having guides constructed to permit of free movement of the float along the line together with means for locking the body to the line at any selected place and which means is shiftable to released position on engagement with the end of a pole when the line has been reeled in to bring the means to the end of the pole whereby the float is attached to the line only by the before mentioned guides so that the fisherman may continue to reel in his line for substantially the entire length of the latter.

Referring in detail to the drawing, the float of the invention includes a body generally designated 10 and which may be of substantially any desired outside dimensions. The body is shown as elongated and generally circular in transverse section and as being of solid construction of any buoyant material. However, it will be understood that the body could be of a shell construction if such is desired and in the latter case would be made in two or more pieces.

Fixed to the lower end of body 10 is a line guide 11 shown as substantially L-shaped and including a portion 12 imbedded in the body. Intermediate the ends of the body but in alignment or substantially in alignment with the guide 11 is a second guide 13 fixed to the body in any desired manner. Guide 13 has an eye or opening 14 therethrough to which access is had through a narrow slot 15 and the guide 11 has an eye or opening 16 to which access is had through a narrow slot 17. Actually the eyes or openings 14 and 16 are in alignment or substantially so and the entrance slot 15 is from one edge of guide 13 while the entrance slot 17 is from the other edge of guide 11.

The body 10 is kerfed through its upper end providing a slot 18 including a step-down portion 19 partially defined by shoulder or wall 20. A dog generally designated 21 is pivotally mounted on the body 10. Said dog includes an outer relatively wide arm or portion 22 having an eye or opening 23 therethrough for a line and access to which eye or opening is provided by narrow slot 24 corresponding with slot 15 of guide 13 but arranged in alternate relation to said slot 15. Dog 22 also includes a web-like portion 25 disposed in the recess or notch 18 and having a pivot 26 passing therethrough and also through the adjacent side portions of body 10 whereby the dog is mounted for pivotal or rocking movement.

Figure 3:
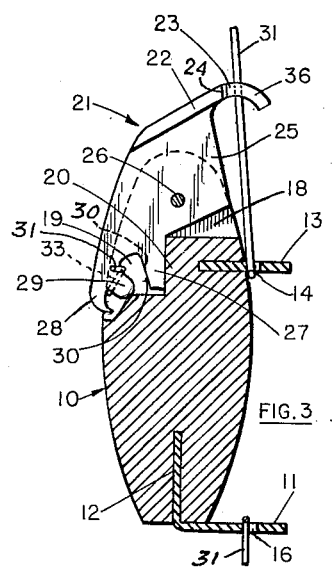
Fig. 3 is a longitudinal sectional view taken as along the line 3—3 of Fig. 2.
Figure 4:
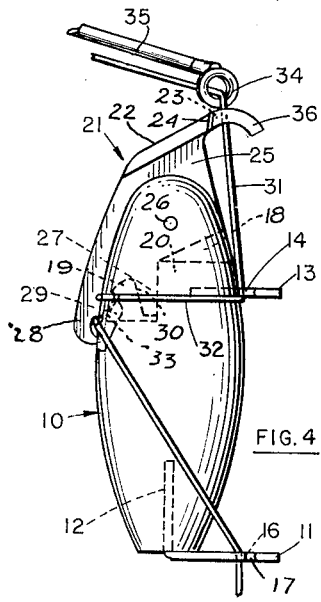
Fig. 4 is a view similar to Fig. 1 but showing the float in relation to a fishing pole as though the line had been reeled in to bring the float to the end of the pole.

Depending from the lower edge of web 25 intermediate the ends of said edge is a tooth 27. Beyond this tooth the web 25 includes an extension 28 from the inner face of which projects a finger 29. When dog 21 is in one position, its line locking position (Figs. 1, 3 and 4), the tooth 27 has one of its edges against the wall 20 and the finger 29 is within the portion 19 of the kerf or recess 18. When the dog is rocked to the other extreme position the finger 29 is wholly removed from the kerf or recess portion 19 (Fig. 6) and the tooth 27 is so positioned that its outer edge 30 is substantially flush with the outer edge of the body 10. The purpose of this construction will later be described.

Figure 6:
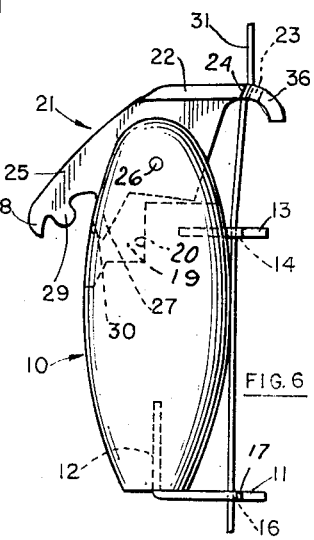
Fig. 6 is a side elevational view showing the locking or securing means in fully released position.
Figure 7:
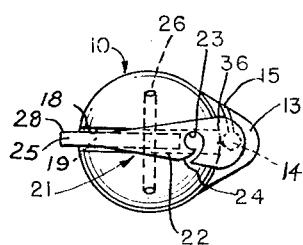
Fig. 7 is a top plan view of the float.
Figure 8:
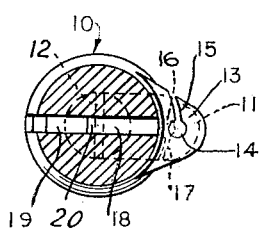
Fig. 8 is a transverse sectional view taken as along the line 8—8 of Fig. 5, the locking means and line being omitted.

When mounting the float of the invention on a line, as the line 31, the latter is pressed through the slots 24, 15 and 17 from alternate opposite edges of the guides 22, 13 and 11 and at such time the line may be straight or substantially so as in Fig. 6 so that the float may be freely moved along the line or the line may be freely moved through the guides.

When the float is properly located with respect to the outer end of the fishing line the latter, from a point immediately below the intermediate guide 13, is carried circumferentially of the body 10 as at 32 and is formed into a loop 33 about the finger 29. Then the dog 21 is rocked on its pivot 26 so as to position it as shown in any of Figs. 1, 3 and 4.

In such figures the finger 29 is within the portion 19 of the kerf, slot or recess 18 and the line is provided with some sharp bends, as at the underside of guide 13 and about the finger 29 and also a portion of the line is carried somewhat into the recess 19. Now the float is locked in place on the line and will stay in this fixed position.

Figure 5:
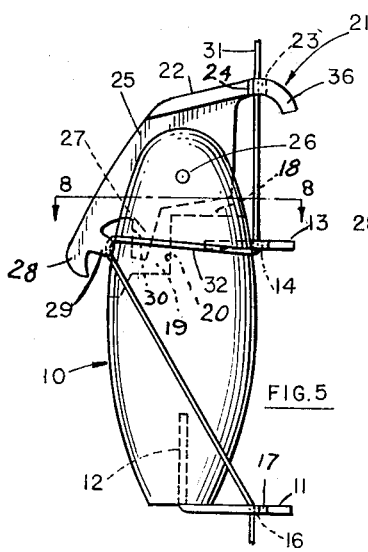
Fig. 5 is an elevational view showing the line securing or locking means as it approaches a release position on further reeling in of the line.

The fisherman proceeds to throw his line out and when he has hooked a fish he begins to wind in on his line. When the winding or reeling in has proceeded to such a point that the portion 22 of dog 21 engages the eye or guide 34 at the end of a pole 35 (Fig. 4) further reeling in will cause rocking or tipping of the dog 21 as through the position of Fig. 5 to the position of Fig. 6. Such movement of the dog carries the finger 29 out of the recess portion 19 and also carries the tooth 27 to the outer edge of such portion.

Therefore, as the line was somewhat wedged in the recess the tooth 27 will push the line out of the recess and the pull of the fish on the line will straighten the latter to the position of Fig. 6. Now the float is free to move along the line or the line is free to move through the guides of the float and the fisherman will continue to wind in his line to any desired extent. For example, he will at least wind in the line until a portion of the latter beyond the pole is of little if any greater length than the length of the pole so that the fish may be conveniently landed.

As the relation of the portion 22 of the dog will not always be the same to the end of the pole when the line is being reeled in such portion has been provided with a slight extension 36 which may come in engagement with the guide at the end of the pole. This extension also prevents the said guide from getting under the free end of the arm 22 in any such way as to prevent dog 21 from being rocked to the released position.

The intermediate guide 13 has such relation to the dog that when the line is carried across to be looped about the finger 29 the line portion 32 will be straight across or preferably will be inclined slightly upwardly so that it has a sharp bend at the under side of the guide and has sharp bends about the finger 29. It is possible that if the line portion 32 were inclined downwardly the dog might be moved to release position by the pull on the end of the line resulting from a casting of the line.

Having thus set forth the nature of my invention, what I claim is:

1. In a fishing float, a body, guides for a line at its lower end and at an intermediate place along the length of said body, said body having a recess therein in a side opposite said intermediate guide, a dog pivotally mounted on the upper end of said body and including a portion movable into and out of said recess, a guide for the line in the upper end of said dog, a finger on said portion of the dog and adapted to have the line looped partly thereabout from the lower side of the intermediate guide and to carry the looped part of the line into said recess when the dog is moved to one position, and a tooth on said portion of the dog and adapted to move the looped portion of the line out of the recess when the dog is rocked on its pivot to another position.

2. In a fishing float, a body, guides for a line at the lower end and at an intermediate place along the length of said body, said body having a recess therein in spaced relation to said intermediate guide, and means movable into and out of said recess and about which the line may be carried from the underside of said intermediate guide and which, when in said recess, will serve to lock the line carried thereabout, and means to move the first means out of said recess to release the line on engagement of the second mentioned means with the end of a pole during reeling in of the line whereby to release said body for free movement along said line to permit of the reeling in of substantially the entire length of the latter.

3. In a fishing float, a body, guides for a line at the lower end and at an intermediate place along the length of said body, said body having a recess therein in a side opposite said intermediate guide, a dog pivotally mounted on the upper end of said body and including a portion movable into and out of said recess, a guide for the line in the upper end of said dog, and a finger on said portion of the dog and adapted to have the line looped partly thereabout from the lower side of said intermediate guide and to carry the looped part of the line into said recess when the dog is moved to one position to lock the body to said line.

4. In a fishing float, a body, a dog pivoted on said body for movement between line holding and line released position, guides for a line on said body and adapted to permit of free movement of the body along the line, said dog adapted to have a portion of the line looped thereabout, means on said body for cooperation with the dog to maintain said portion of the line looped thereabout when the dog is in line holding position whereby to secure the body against movement along the line, said dog including a portion at the upper end of said body and comprising one of said line guides and positioned to engage a pole carrying the line attached to the float being reeled in to an extent sufficient to bring the float up to the pole, and said dog and portion being rigid whereby on such engagement the dog is rocked to line released position on its pivotal mounting to release the looped line portion from the means on the body whereby the float is released for free movement along the line to permit of further reeling in of the latter.

5. In a fishing float, a buoyant body, line guides on said body and constructed to permit of free movement of the float along a pole carried line, a member on said body and pivotal thereon between line locking and line releasing positions, said member when in line locking position adapted to lock the float to the line, said member including a portion located at the outer side of the top of said body to be engaged by the pole on said float being brought approximately to the pole on reeling in of the line, and said member and portion being rigid whereby said member is rocked on its pivot on such engagement of its portion with the pole and is rocked to line releasing position by such engagement to permit of reeling in of the line beyond the place where the float was locked to the line.

FRANK R. CURTISS.

REFERENCES CITED

The following references are of record in the file of this patent:

UNITED STATES PATENTS

| Number | Name | Date |
|---|---|---|
| 250,848 | Smith | Dec. 13, 1881 |
| 2,376,958 | Chapman | May 29, 1945 |

FOREIGN PATENTS

| Number | Country | Date |
|---|---|---|
| 371 | Great Britain | of 1913 |